Sept. 20, 1966     D. H. SCHULER     3,273,734
FEED MIXING AND BLENDING MACHINE
Filed Sept. 26, 1963     7 Sheets-Sheet 1

INVENTOR
DORLAND H. SCHULER
BY Dick + Zarley
ATTORNEYS

Sept. 20, 1966  D. H. SCHULER  3,273,734
FEED MIXING AND BLENDING MACHINE
Filed Sept. 26, 1963  7 Sheets-Sheet 2

INVENTOR
DORLAND H. SCHULER
BY Dick + Zarley
ATTORNEYS

Sept. 20, 1966  D. H. SCHULER  3,273,734
FEED MIXING AND BLENDING MACHINE
Filed Sept. 26, 1963  7 Sheets-Sheet 4

INVENTOR
DORLAND H. SCHULER
BY
Dick & Zarley
ATTORNEYS

Sept. 20, 1966    D. H. SCHULER    3,273,734
FEED MIXING AND BLENDING MACHINE
Filed Sept. 26, 1963    7 Sheets-Sheet 5

INVENTOR
DORLAND H. SCHULER
BY
Dick + Zarley
ATTORNEYS

Sept. 20, 1966  D. H. SCHULER  3,273,734
FEED MIXING AND BLENDING MACHINE
Filed Sept. 26, 1963  7 Sheets-Sheet 7

INVENTOR
DORLAND H. SCHULER
BY Dick + Zarley
ATTORNEYS

United States Patent Office 3,273,734
Patented Sept. 20, 1966

3,273,734
FEED MIXING AND BLENDING MACHINE
Dorland H. Schuler, Griswold, Iowa
Filed Sept. 26, 1963, Ser. No. 311,748
8 Claims. (Cl. 214—521)

This invention relates to a feed wagon and in particular to a feed wagon for mixing and blending feeds.

The concept of operation employed in the feed mixing and blending wagon of this invention is to take the feed at the point of discharge from the wagon and return it to the wagon thereby mixing it as it moves through this cycle of operation. When the blending and mixing operation has been completed, the return feed material conveyor may be repositioned for discharge of the feed at a feeding station or the like.

Thus, it is an object of this invention to provide a feed wagon which has a discharge means which may be selectively used for returning the feed to the wagon for purposes of mixing and blending or using the discharge means for emptying the wagon of its feed material;

It is a further object of this invention to provide a feed wagon having a discharge conveyor means capable of operation independent of other conveyor assemblies associated with the feed wagon;

It is a further object of this invention to provide a feed mixing and blending wagon having a feed discharge conveyor means carried on a support structure which may be rotated nearly 270 degrees to reach remote feeding stations;

It is a further object of this invention to provide a feed discharge conveyor means which may be rotated 360 degrees relative to its support assembly;

It is a further object of this invention to provide a discharge conveyor means which is operated by a hydraulic pump means;

It is a further object of this invention to provide a mixing and blending wagon having a discharge conveyor capable of readily receiving an extension conveyor unit for discharging feed at feeding stations remote from the wagon;

It is a further object of this invention to provide a blending and mixing wagon having a discharge conveyor means equipped with quick release fasteners for engagement with a conveyor extension unit; and A further object of this invention is to provide a feed mixing and blending machine which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 1:
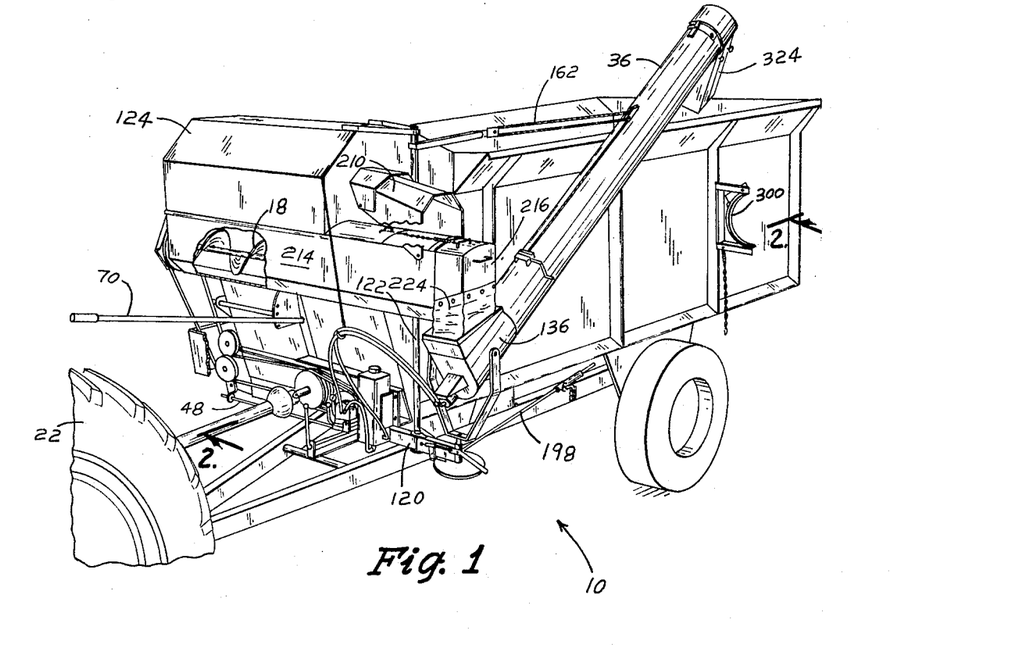
FIG. 1 is an elevation perspective view of the feed mixing and blending wagon.
Figure 2:
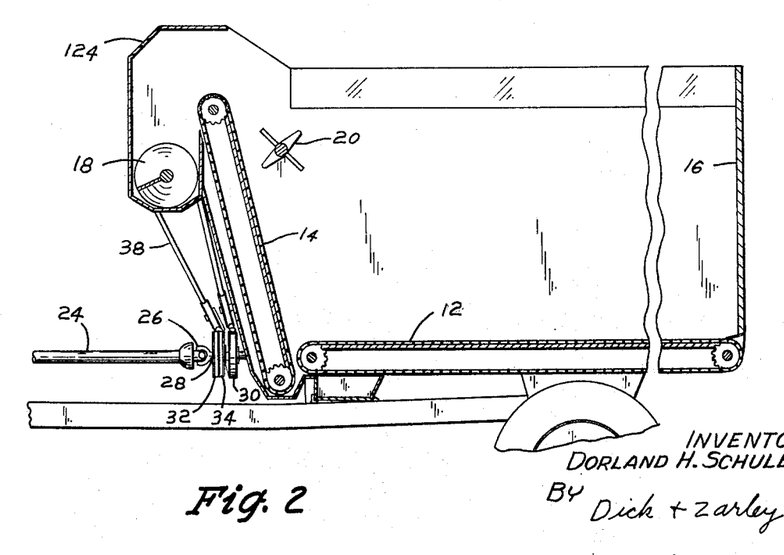
FIG. 2 is an elevation cross-sectional view of the feed mixing and blending wagon taken along line 2—2 in FIG. 1.

The feed mixing and blending wagon of this invention is referred to generally by the reference numeral 10 in FIG. 1 of the drawings. Conventional with this wagon is a horizontal floor conveyor 12 which may be operated in either a forward or rearward direction for conveying to the vertical conveyor 14 or the rear gate 16. The vertical conveyor 14 discharges the material from the wagon into an auger horizontal conveyor 18 at the forward end of the wagon. The material may then be rerouted back into the wagon or discharged at a feeding station as will hereinafter be described. To assist in the mixing and breaking up of solid pieces of feed material, an agitator reel 20 is positioned across the forward end of the wagon adjacent the vertical conveyor 14.

Power is supplied from a tractor 22 or the like to its power take-off (not illustrated) which is connected to a power take-off shaft 24 which in turn is connected to a universal joint 26 on a shaft 28 extending forwardly of the front end of the wagon. The shaft 28 carries thereon a pulley 30 for driving conveyors 12, 14 and 18 and pulleys 32 and 34 for operation of an auxiliary auger conveyor 36 as shown in FIG. 1.

Figure 32:
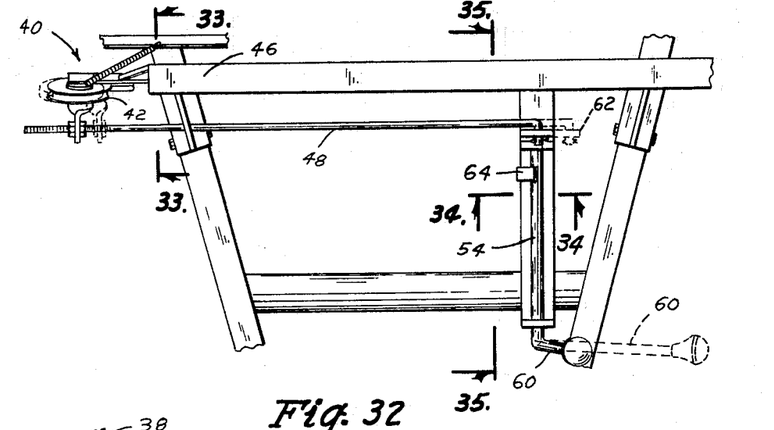
FIG. 32 is a top plan view of the belt tightener assembly associated with the drive belts connecting the power take-off shaft to the wagon conveyors.
Figure 33:
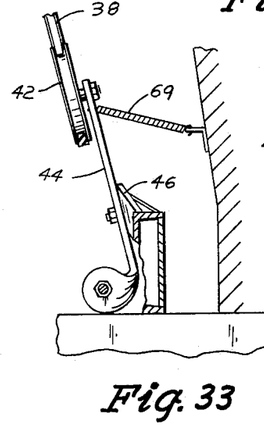
FIG. 33 is an elevation cross-sectional view taken along line 33—33 in FIG. 32.
Figures 34, 35:
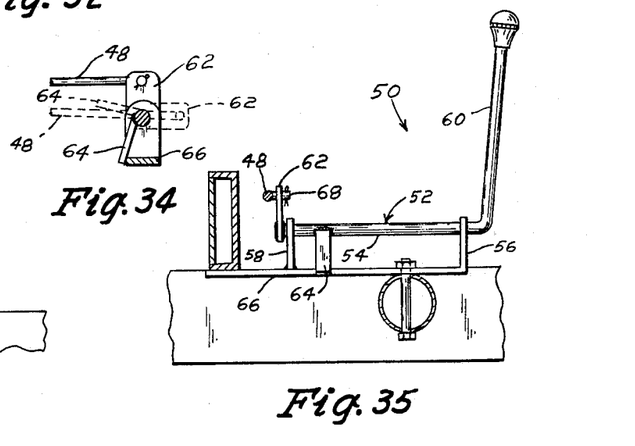
FIG. 34 is a cross-sectional elevational view taken along line 34—34 in FIG. 32.
FIG. 35 is a cross-sectional elevational view taken along line 35—35 in FIG. 32.

In FIGS. 1, 2 and 32 through 35 it is seen that the power transmitted by the pulley 30 through a belt 38 (FIG. 2) may be selectively controlled by a belt tightener type clutch generally referred to in FIG. 32 by the reference numeral 40. A belt tightener pulley 42 is rotatably connected to one end of an arm 44 which is pivotally connected intermediate its ends to a wagon frame portion 46 (FIG. 33). The lower end of the arm 44 is adjustably coupled as shown in FIG. 32 to an elongated rod 48 which extends to the right of the forward end of the wagon, as viewed in FIG. 1, where it is connected to an over center type control assembly 50, as seen in FIG. 35.

The control assembly 50 comprises a rocker arm 52 having a horizontal portion 54 rotatably supported on mounts 56 and 58. An upwardly extending handle portion 60 is provided at one end thereof and a corresponding upwardly extending vertical element 62 is fixedly secured to the opposite end of the portion 54 adjacent the mount 58. To limit the counterclockwise rotation of the rocker arm 54, as viewed in FIG. 32, a stop element 64 is welded to the transverse arm portion 54 for engagement with the wagon frame portion 66. The rod element 48 through an angle end portion 68 is pivotally connected to the upper end of the element 62 on the rocker arm 52. Thus, as seen in FIGS. 32 and 34, the pulley 42 will loosely engage the belt 38 when the element 62 is extending vertically and the stop member 64 is in engagement with the frame portion 66, but by rotation of the handle 60 90 degrees to the right as seen in FIG. 32, the element 62 will assume the horizontal position shown in FIG. 34 whereby the rod 48 is pulled to the right causing the pulley 42 to move into engagement with the belt 38. The pulley 42 will remain in engagement with the belt 38 as long as the element 64 extends at least parallel to the rod 48 as shown in FIG. 34. To prevent it from being jarred back to its vertical position and releasing the tightener pulley 42 from the belt 38 the handle 60 may be moved further to the right causing the element 62 to move downwardly against the frame portion 66 whereby positive intentional movement of the handle 60 would be required to disengage the pulley 42 from the belt 38. A spring 69 urges the pulley 42 out of engagement with the belt 38.

The rate of forward travel of the floor conveyor 12 (FIG. 2) may be changed by operation of the lever 70 as shown in FIG. 1. Also the direction of the floor conveyor may be changed to discharge materials out of the rear gate of the wagon by reversing the ratchet wheel and dogs not shown in the drawings since they are not considered to constitute a part of this invention.

Figure 28:
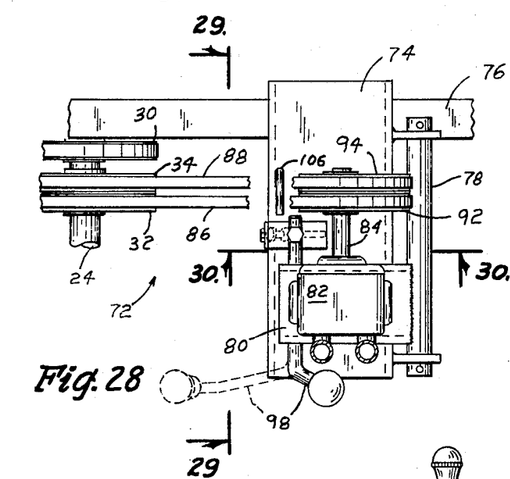
FIG. 28 is a top plan view of the drive mechanism coupled to the power take-off shaft associated with the auxiliary feed discharge conveyor only.
Figure 29:
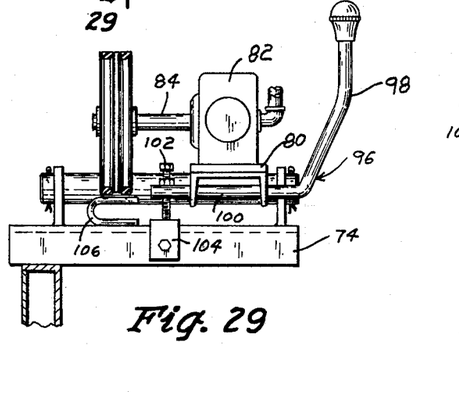
FIG. 29 is a cross-sectional elevation view taken along line 29—29 in FIG. 28.

A belt tightener type clutch mechanism generally referred to by the reference numeral 72 in FIG. 28 is associated with the auxiliary discharge feed conveyer 36 (FIG. 1). A channel shaped platform 74 is fixedly secured to the wagon frame portion 76 as shown in FIG. 28 and has a rocker shaft 78 rotatably connected along one side thereof. To the rocker shaft 78 a second platform 80 is fixedly secured for pivotal movement in a vertical plane towards and away from the platform 74. A pump 82 is mounted on the platform 80 and has a shaft 84 extending parallel to the platform 74 to a position where belts 86 and 88 embracing pulleys 32 and 34 respectively, can be entrained around a pair of corresponding pulleys 92 and 94 mounted on the end of the shaft 84. As shown in FIG. 29, a rocker arm 96 is pivotally secured to the outer end of the pump support platform 80. The rocker arm 96 includes a handle portion 98 and a shaft portion 100 which extends through the side flanges of the channel support member 80. A transversely extending adjustable bolt 102 extends through the outer end of the rocker arm portion 100 and when the rocker arm is in one position, the bolt 102 is, as shown in FIG. 30, in a vertical position in bearing engagement against a re-enforcing plate 104 positioned on the top of the support platform 74.

Figure 30:
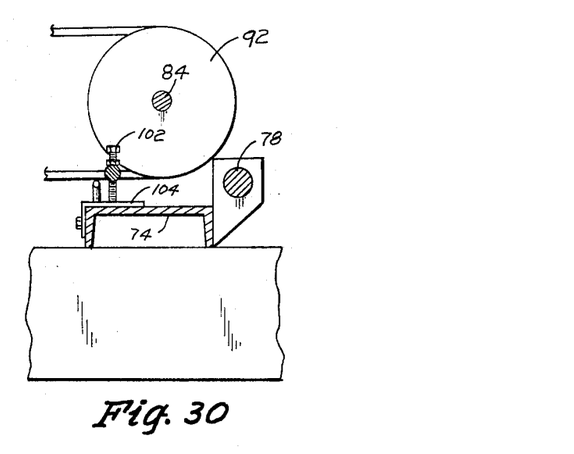
FIG. 30 is a cross-sectional elevation view taken along line 30—30 in FIG. 28.
Figure 31:
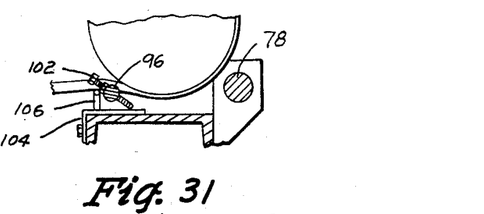
FIG. 31 is a fragmentary view of the belt tightener shown in FIG. 30 but illustrated in a disengaged position.

Thus it is seen from FIGS. 28, 30 and 31 in particular that as the rocker arm 96 is rotated to the left or counterclockwise, the pulleys 92 and 94 will move closer to the corresponding drive pulleys 32 and 34 thus causing disengagement therebetween. The rocker arm 96 when in its solid line position as shown in FIG. 28, supports the pulleys 92 and 94 in their engaged position farthest from their corresponding pulleys 32 and 34 by the fact that the bolt 102 is perpendicular to the support member 74, but as the rocker arm 96 is rotated to the left, the bolt element 102 assumes a position at an angle to the support member 74 as shown by the dash lines in FIG. 28 and the solid lines in FIG. 31. In order that the belts 86 and 88 will not become too loose about the pulleys 32, 34, 92 and 94, a permanent type belt guide and tightening means 106 is affixed in a perpendicular position on the support member 74 and engages the outer surface of the belts 86 and 88.

Figure 27:
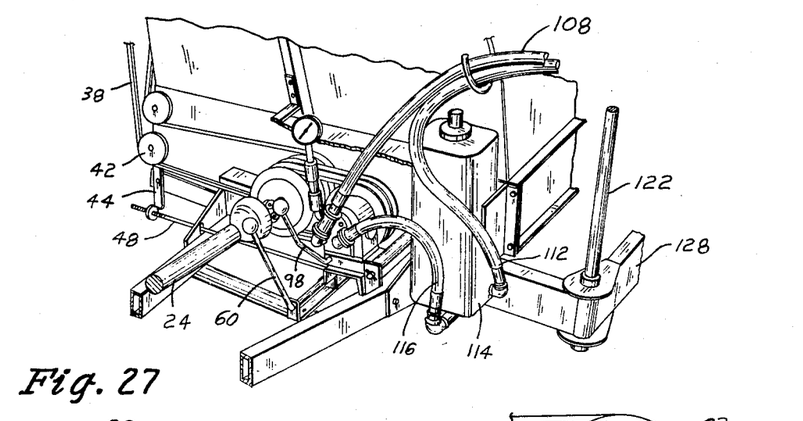
FIG. 27 is a fragmentary perspective view of the lower forward end of the feed wagon showing in particular the drive mechanisms connected to the wagon conveyors and the auxiliary feed discharge conveyor.
Figure 36:
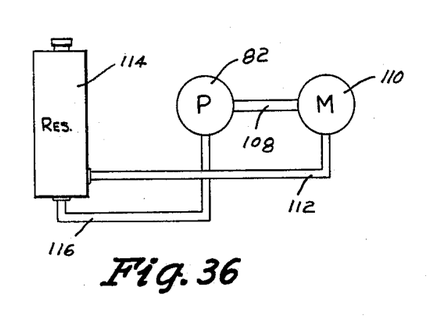
FIG. 36 is a schematic drawing of the hydraulic system associated with the hydraulic motor used to drive the auxiliary feed discharge conveyor.

From the pump 82, hydraulic fluid is transferred to the conduit 108 (FIGS. 27 and 36) to a hydraulic motor 110 of conventional design and then back through a conduit 112 to a hydraulic fluid reservoir tank 114. A return conduit 116 serves to supply hydraulic fluid to the pump 82 from the reservoir 114.

Figures 22, 23, 24, 25, 26:
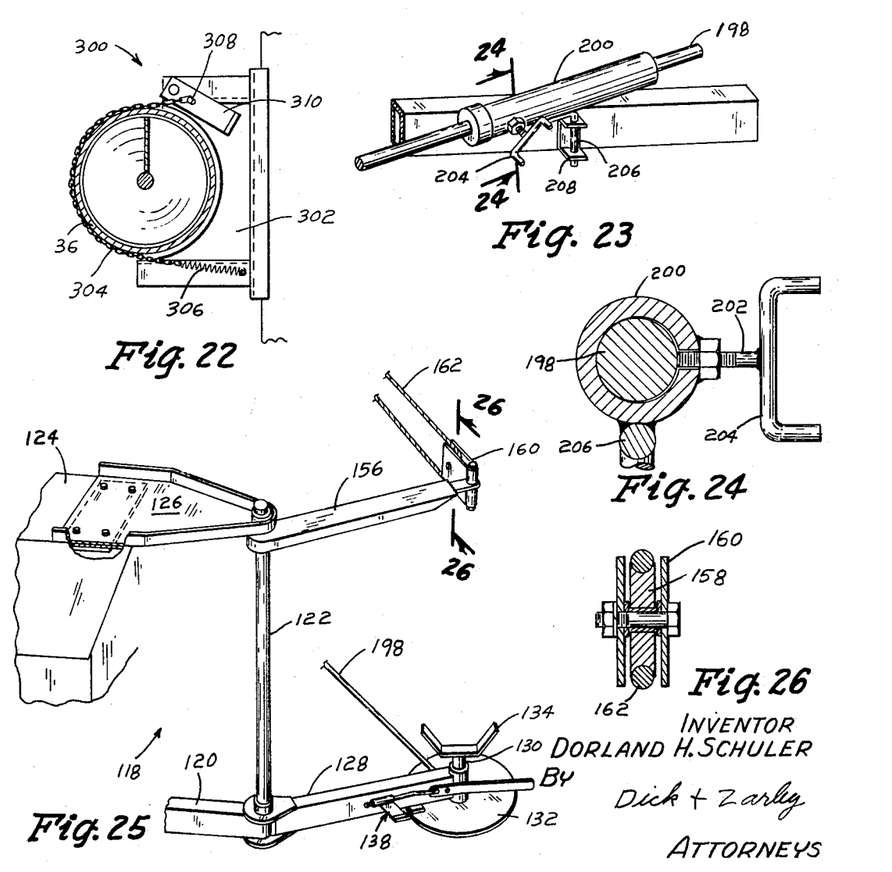
FIG. 22 is an elevation cross-sectional view taken along line 22—22 in FIG. 3 showing in particular the means for holding the auxiliary discharge conveyor in a transport position along the side of the wagon.
FIG. 23 is a fragmentary perspective view of the anchoring means associated with the auxiliary discharge conveyor support assembly as shown in FIG. 1.
FIG. 24 is a cross-sectional elevation view taken along line 24—24 in FIG. 23.
FIG. 25 is a perspective view of the auxiliary discharge conveyor support assembly.
FIG. 26 is an elevation cross-sectional view taken along 26—26 in FIG. 25.

The auxiliary discharge auger conveyor 36 which is driven by the hydraulic motor 110 is adjustably supported by a support assembly generally referred to in FIG. 25 by the reference numeral 118. As viewed in FIG. 1, an arm portion 120 extends transversely of the wagon along the lower forward end and has a vertical post 122 connected at its lower end thereto. The upper end of the post 122 is connected to the auger 18 housing 124 by a bracket 126. Pivotally connected at the lower end of the vertical post 122 is a lower support arm 128. A shaft 130 extends vertically through the free end of the arm 128 and has a circular foot member 132 on the lower end thereof under the arm 128 and a U-shaped support bracket 134 fixedly secured to the upper end of the shaft 130. As seen in FIG. 1, the arms of the U-shaped bracket 134 which flare outwardly engage the hopper portion 136 of the auger conveyor 36 at the sides thereof.

Figures 9, 10, 11, 12, 13:
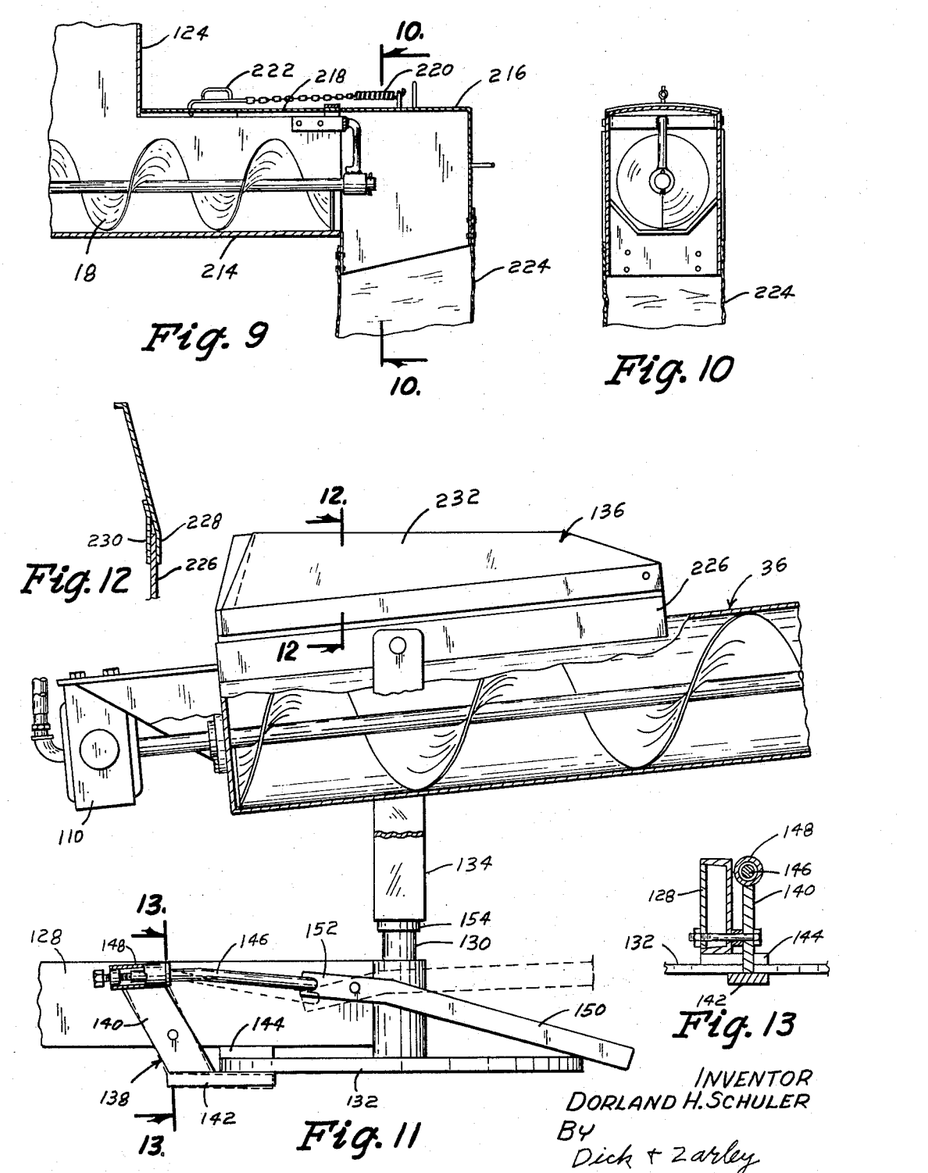
FIG. 9 is a fragmentary elevation view taken along line 9—9 in FIG. 3 and showing in particular the horizontal auger conveyor mounted at the forward end of the wagon.
FIG. 10 is an elevation cross-sectional view taken along line 10—10 in FIG. 9 showing in particular the discharge end of the horizontal forwardly positioned wagon auger conveyor.
FIG. 11 is an elevation fragmentary view of the lower end of the auxiliary auger conveyor and its associated support structure.
FIG. 12 is a cross-sectional view taken along line 12—12 in FIG. 11 of the hopper portion associated with the auxiliary discharge conveyor.
FIG. 13 is a cross-sectionaol view taken along line 13—13 in FIG. 11 showing the auxiliary discharge conveyor supporting structure and locking mechanism which prevents the rotational movement of the auger conveyor relative to the feed wagon.

Rotational movement of the circular plate 132 and consequently the auger conveyor 36 is limited by the brake assembly 138 best shown in FIG. 11. An element 140 is pivotally connected to the arm 128 and carries at its lower end an element 142 which extends under the circular plate 132. Directly above the free end of the elements 142 and the peripheral edge of the plate 132 is a bearing plate element 144 welded to the under side of the arm 128. A rod 146 is adjustably connected by a coupling element 148 to the upper end of the pivotal element 140. The other end of the rod 146 is pivotally connected to a pivotal control arm 150 which is also pivotally connected to the arm 128. The control arm 150 is of the over center type and thus when in the position as shown by the solid lines in FIG. 11, the portion 152 connected to the rod 146 is parallel or at a slight angle thereto thereby positively holding the pivotal element 140 in its solid line position as shown in FIG. 11. Consequently the plate 142 will bear against the under side of the circular plate 132 and force it up against the bearing plate 144 and thereby limit rotation of the auger conveyor 36 about the longitudinal axis of the shaft 130. When the brake 138 is released the shaft 130 may drop downwardly relative to the arm 128 to a position with the bearing element 154 in engagement with the top edge of the arm 128.

At the upper end of the post 122 (FIG. 25) an arm 156 is fixedly secured and disposed relative thereto in a vertical plane extending through the arm 128. Consequently, as the arm 128 pivots it carries with it the post 122 which in turn pivots the arm 156.

Figures 14, 15:
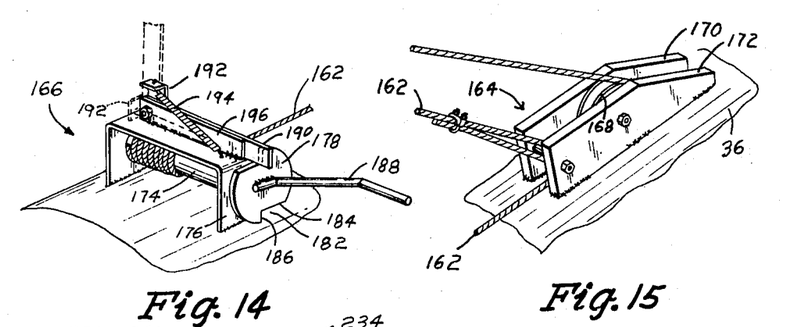
FIG. 14 is a perspective fragmentary view of the reeling mechanism associated with the auxiliary discharge conveyor.
FIG. 15 is a fragmentary perspective view of a means positioned intermediate the ends of the auxiliary discharge conveyor for securing one end of the cable controlled by the reel shown in FIG. 14.

On the arm 156 is a pulley 158 (FIG. 26) carried by a bracket 160 which is pivotally connected to the outer free end of the arm 156. A cable 162 extends over the pulley 158 and has one end secured to a tie-down assembly 164 as seen in FIGS. 1 and 15. The other end of the cable 162 is secured to a reel assembly 166 as shown in detail in FIG. 14. Intermediate the ends of the cable 162 it passes over a pulley 168 in the tie-down assembly 164. As shown in FIG. 15, the tie-down assembly 164 comprises a pair of parallel plates 170 and 172 secured longitudinally of the discharge conveyor 36 on the upper outer face thereof.

The reel assembly 166 includes a windup shaft 174 which rotatably extends between the legs of a U-shaped inverted bracket 176. A cam element 178 having oppositely disposed notches 182 formed in its outer peripheral edge is positioned on the outer end of the shaft 174 adjacent the U-shaped support bracket 176. The notches 182 have side edges 184 and 186 which extend at right angles to each other. For rotating the shaft 174 and to reel in and out the cable 162, a lever 188 is mounted on the outer face of the disk plate 178. A top of the U-shaped bracket 176, a latch element 190 extends for engagement with the notches 182 in the disk plate 178. The end of the latch element 190 opposite the plate 178 has a portion 192 integrally extending at a right angle thereto and as shown in FIG. 14 in the solid lines extends perpendicular to the top of the support bracket 176. By this relationship a spring 194 connected to the element 192 and to the support bracket 176 holds the latch element 190 in its downward position in engagement with the notches 182 of the disk plate 178. However, by moving the latch element 190 to a vertical position shown by the dash lines in FIG. 14, the spring 194 will also hold the latch element 190 in a vertical position since the spring 194 or its line of pull is parallel to the element 192, or if desired the spring 194 may lie in a plane slightly below the plane extending between the point at which the spring 194 is secured to the bracket 176 and the pivotal connection of the latch element 190 to the vertically disposed plate element 196 thereby causing the latch element 192 to pivot downwardly into the support bracket 176 as shown by the dash lines in FIG. 14. In either case, the latch element 190 will be held out of engagement with the disk plate 178 to permit the counterclockwise movement thereof for reeling out the cable 162. It is seen that when the cable is reeled in, the plate 178 will act as a cam and move under the latch element 190 and sequentially engage the notches 182.

To control the movement of the support assembly 118 for the auger conveyor 36 in a horizontal plane about an axis through the post 122, as shown in FIG. 1, an anchor arm 198 is pivotally secured to the arm 128 as shown in FIG. 25 and has its other end adjustably secured to the frame of the wagon. The manner in which the arm 198 is secured to the frame is best illustrated in FIG. 23 wherein it is seen that a tube like member 200 telescopically receives the end of the rod member 198. An adjustable set screw 202 is shown in FIG. 24 as being adapted to engage the rod 198 and hold it at any desired position. A handle element 204 is formed on the outer end of the set screw 202. Along the lower side of the tube 200 is an angular element 206 which is pivotally connected to the wagon frame by a U-shaped bracket 208. Thus it is seen by the selective adjustment of the anchor rod 198, the discharge conveyor 36 on its support arms 128 and 156 may be moved to positions permitting the conveyor 36 to extend forwardly and to the left of the wagon as shown by the dash lines in FIG. 4 or to the right side and rearwardly of the wagon as shown by the solid lines in FIG. 4 and also in FIG. 1.

Figures 3, 4, 5, 6, 7, 8:
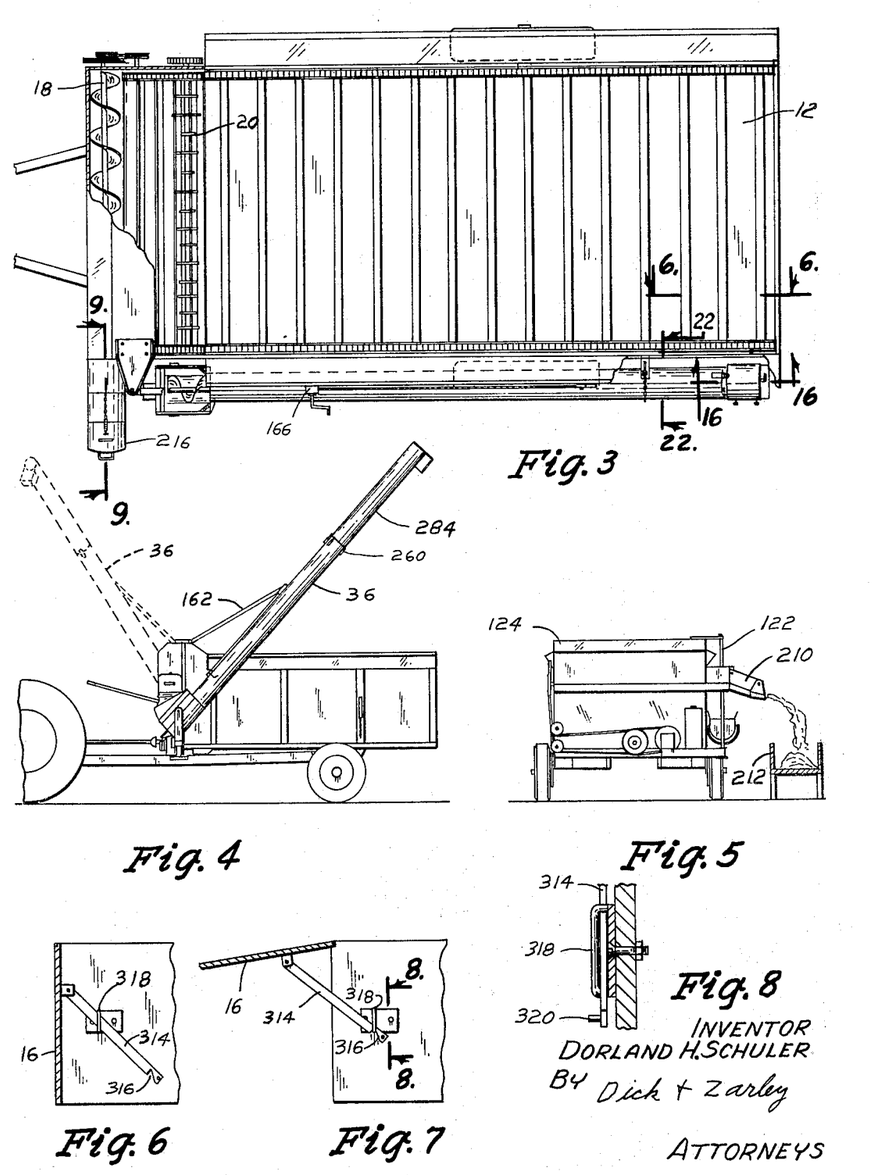
FIG. 3 is a top plan view of the feed mixing and blending wagon with portions broken away for purposes of illustration.
FIG. 4 is a side elevation view of the feed mixing and blending wagon showing in particular the discharge conveyor including an extension unit in two positions of use.
FIG. 5 is a front end elevation view of the feed mixing and blending wagon and showing in particular feed material being discharged directly from the wagon independently of the auxiliary feed discharge conveyor means, which is shown in its storage position.
FIG. 6 is a fragmentary cross-sectional view taken along line 6—6 in FIG. 3 of the rear end of the wagon showing in particular the rear door latch means.
FIG. 7 is a view similar to FIG. 6 showing the rear gate or door of the wagon in its open position and held by the latch means.
FIG. 8 is a cross-sectional view along line 8—8 in FIG. 7 showing in particular the rear door latch means construction.

When the feed material in the wagon is discharged from the discharge end of the auger conveyor 18, it may be deposited by a spout 210 at a feeding station 212 as shown in FIG. 5 or as shown in FIG. 1, into the hopper 136 of the auxiliary feed discharge conveyor 36. As shown in FIG. 1, the spout 210 is pivotally moved counterclockwise to an out of the way position atop of the housing 214 covering the discharge end of the auger 18.

When the auger 18 is to discharge into the hopper 136 of the auxiliary conveyor 36, an adapter housing unit 216 is placed on the end of the housing 214. The unit 216 is cap like in construction and has a bill element 218 which matingly engages the forward edge of the top portion of the auger housing 214, as shown in FIG. 9. A spring 220 is connected to the unit 216 and by a hook element 222 is adapted to releasably engage the top portion of the housing 214. On the discharge end of the unit 216, a flexible canvas or the like material spout 224 is provided which is telescopically received in the hopper 136 provided on the lower end of the auxiliary conveyor 36.

In FIGS. 11 and 12 the hopper 136 is shown to comprise a lower inlet housing unit 226 having a peripheral edge extending between a pair of parallel closely spaced peripheral edge elements 228 and 230 (FIG. 12) formed on the lower end of an adapter sleeve 232.

Figures 16, 17, 18, 19:
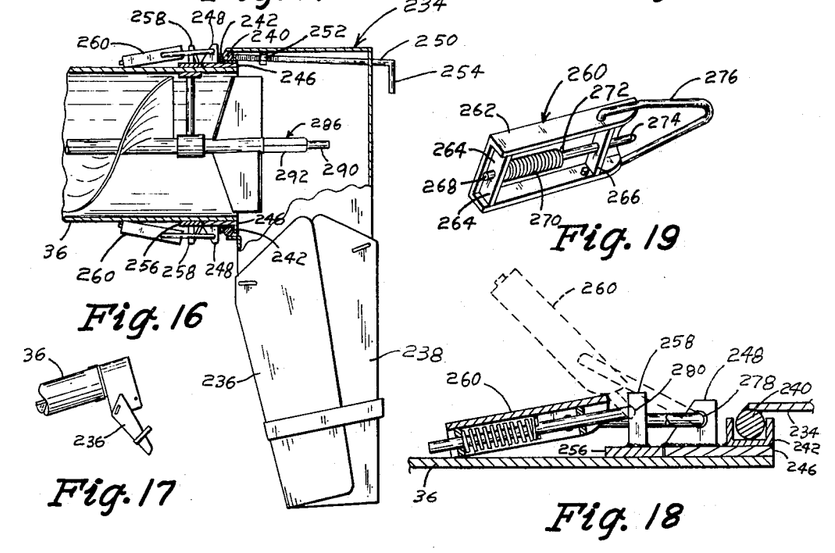
FIG. 16 is a fragmentary elevation cross-sectional view taken along line 16—16 in FIG. 3 and showing in particular the discharge end of the auxiliary discharge conveyor and also showing the clamping means and associated spout positioned at the discharge end of the conveyor.
FIG. 17 is a side elevation view of the spout on the end of the discharge conveyor shown in FIG. 16 but with the outer half of the spout removed.
FIG. 18 is an enlarged cross-sectional view of only the quick release fastener means and the associated conveyor and spout structure shown in FIG. 16.
FIG. 19 is a perspective view of the quick release fastener used in FIG. 16 to secure the spout to the discharge end of the auxiliary discharge conveyor.

In discharging the feed material from the discharge end of the auxiliary conveyor 36, considerable flexibility is provided as shown for example FIGS. 1, 4, 16, and 20. A discharge end construction employed when the feed is fed back into the wagon is shown in FIGS. 1 and 16. In this case, a spout assembly 234 is mounted on the discharge end of the conveyor 36. It is shown in FIGS. 16 and 17 to comprise a pair of removable spout elements 236 and 238. The upper end of the spout assembly 234 is adapted to telescopically fit over the discharge end of the auger conveyor 36 as shown in FIG. 16. The portion of the spout assembly 234 which is telescoped over the discharge end of the auxiliary conveyor 36 includes a circular rod 240 welded to the inside face of the spout for movable engagement in a circular channel 242. Although the rod 240 cannot be removed from the channel 242, it can rotate relative thereto and move longitudinally thereof. The channel 242 is then welded to an annular plate 246 which is adapted to matingly engage the outer surface of the auger tube of the auxiliary conveyor 36. Adjacent the channel 242 are nose like elements 248 positioned diametrically opposite each other and welded to the plate 246.

At the opposite end of the spout assembly 234 from the spout elements 236 and 238 is a long bolt 250 which is threadably received in a nut 252 welded to the inner face of the top wall of the spout assembly 234. The inner end of the bolt 250 is adapted to bear against the inner leg of the channel 242 while the outer end of the bolt extends through the outer wall of the spout assembly and terminates in a L-shaped handle portion 254.

Adjacent the outer end of the tube of the auxiliary auger conveyor 36 is an annular plate 256. The annular plate 256 is held against relative movement by weld or the like and has a pair of shoulder portions 258 disposed diametrically opposite each other and adapted to be in longitudinal alignment with the nose portions 248 on the spout assembly 234. The annular plate 256 serves as a stop element to prevent the plate 246 carried on the spout assembly 234 from moving too far along the outer end of the tube of the auger conveyors 36.

As best shown in FIGS. 18 and 19, a quick release clamping device 260 is used to releasably connect the spout assembly to the end of the auxiliary conveyor 36 by engagement with the adjacent elements 248 on the spout assembly and the elements 258 on the auger conveyor. The clamp 260 includes a chanel shaped portion 262 with a pair of end plates 264 and 266. A pin 268 is disposed centrally and longitudinally of the legs of the channel 262 and extends through the end plates 266 and 268. A spring 270 is positioned on the pin 268 and bears against the end plate 264 and a stop pin 272 extending through the pin 268. As appears obvious from FIGS. 18 and 19, the pin 268 has a portion 274 normally biased forwardly of one end of the channel 262. The adjacent side portions of the channel 262 at this end are pivotally engaged by the opposite end portions of a V-shaped rod element 276.

Thus, as shown in FIGS. 16 and 18, the V-shaped element 276 is adapted to be received at its vertex in a hole 278 and the nose portion 248 carried on the spout assembly 234. The portion 274 of the pin 268 is shown by the dash lines in FIG. 18 to engage a recess 280 formed in the side of the element 258. By pivotal movement of the channel member 262 downwardly toward the auger conveyor 36 as shown in FIG. 18 to a position represented by the solid lines, the clamping device 260 will be held in its locked position since the pin 268 extends below a plane passing through the recess 280 and the hole 278. When it is desired to release the clamping device 260, it is necessary to only lift the channel portion 262 upwardly as viewed in FIG. 18 away from the auger conveyor 36 to a position represented by the dash lines and the clamp device will be carried by the spout assembly 234.

Figure 20:
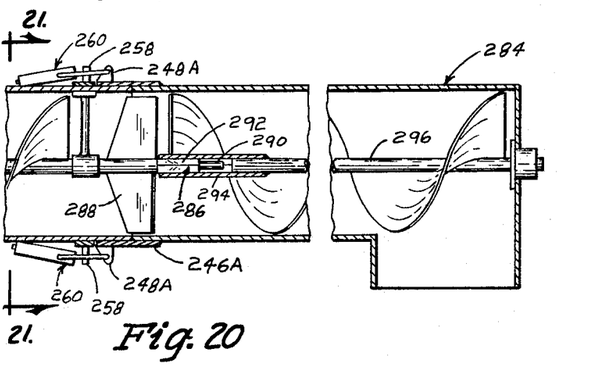
FIG. 20 is an elevation view of the auxiliary discharge conveyor with an extension conveyor unit mounted thereon and showing in particular the details of this connection.
Figure 21:
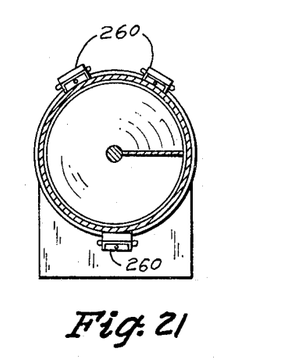
FIG. 21 is an elevation cross-sectional view taken along line 21—21 in FIG. 20.

In FIGS. 4, 20 and 21 an extension auger unit 284 is substituted on the discharge end of the auger conveyor 36 for the spout assembly 234 and is secured thereto in the same manner as the spout assembly 234 i.e., by the use of the clamps 260. Since greater strain is placed on the auger conveyor unit 36 by the extension unit 284, three clamps 260 are used.

To accommodate the extension unit 284, the auger conveyor 36 includes an auger shaft extension 286 positioned outwardly of slinger blades 288. On the outer end of the shaft extension 286 is a centering shaft element 290 which is integral and smaller in diameter than an inner portion 292 which is square in cross-section and adapted to matingly engage an axial auger sleeve portion 294 telescopically connected at its other end to an auger shaft 296 extending through the extension auger unit 284. As shown in the drawings, the slinger elements 288 are effective for purposes of advancing the feed material either into a spout assembly 234 as shown in FIG. 16 or into the extension auger assembly as shown in FIG. 20. The extension auger unit 284 may be of any desired length since a positive mechanical connection is made to the discharge end of the auxiliary auger conveyor 36 by the use of the clamps 260 which hold the extension auger shaft sleeve portion 294 in essentially integral relationship with the shaft portion 292 of the auger conveyor 36.

When the auxiliary discharge auger conveyor 36 is not in use, its discharge end is secured to the side of the wagon in engagement with a concave mounting bracket 300 as shown in FIGS. 1, 3, 5 and 22. In FIG. 22 it is seen that a concave support member 302 on the side of the wagon engages one side of the auger conveyor tube while a chain 304 extends around the opposite side and is connected at one end to a spring 306 which in turn is connected to the support member 302. The end of the chain 304 opposite the spring 306 is engaged by a hook 308 carried on an arm 310 which is pivotally mounted on the support member 302. This provides for an overcenter type locking means wherein as shown in FIG. 2 the spring 306 holds the chain 304 in locking engagement about the auger conveyor 36 since the arm 310 is being pulled downwardly into engagement with the outside of the auger conveyor 36. After the arm 310 has been rotated counterclockwise a predetermined distance the spring 306 will automatically pull the arm to an unlocked position approximately 180 degrees away from its position as shown in FIG. 22 of the drawings.

For purposes of discharging feed out the rear end of the wagon through operation of the horizontal floor conveyor 12, the pivotal gate 16 is shown in FIGS. 6 through 8 secured to the top rear corners of the wagon side walls. As shown in FIG. 7, a gravity type support arm 314 having a notched portion 316 is adapted to slidably engage a U-shaped locking rod element 318 affixed to the inside surface of the wagon side wall. Consequently, when the gate 16 is lifted upwardly, the notch 316 will move into engagement with the locking element 318 and conversely when the member 314 is pivoted upwardly, the notched portion will move out of locking engagement with the locking element 318 and assume the position as shown in FIG. 6 whereby the gate 16 is permitted to move by gravity to its closed position. In order to prevent the support member 314 from being completely separated from the locking element 318, a perpendicular pin 320 has been provided on the outermost end thereof to engage the locking rod element 318 as shown in FIG. 8.

From a consideration of the foregoing disclosure, it will be obvious that all of the initially recited objects of the present invention have been achieved.

Some changes may be made in the construction and arrangement of my feed mixing and blending machine without departing from the real spirit and purpose of my invention, and it is my intention to cover by my claims, and modified forms of structure or use of mechanical equivalents which may be reasonably included within their scope.

I claim:

1. In a feed mixing and blending machine, comprising, a feed wagon;
a feed discharge conveyor in communication with the inside of said wagon;

a support arm pivotally connected to an outer corner of said wagon and adapted to pivot in a horizontal plane;

a return auger conveyor in communication with said feed discharge conveyor;

a vertical shaft means rotably connected to the support arm;

a plate member fixedly secured to the lower end of said vertical shaft below said support arm;

a clamp member pivotally connected to said support arm and adapted to engage the lower surface of said plate member to hold said plate member in frictional contact with said support arm; and means fixedly connected to the upper end of said vertical shaft and pivotally connected to one end of said return auger conveyor.

2. In a feed mixing and blending machine, comprising, a feed wagon;

a feed discharge conveyor in communication with the inside of said wagon;

a support arm pivotally connected to an outer corner of said wagon and adapted to pivot in a horizontal plane;

a return auger conveyor in communication with said feed discharge conveyor;

a vertical shaft means rotatably connected to the support arm;

a plate member fixedly secured to the lower end of said vertical shaft below said support arm;

a clamp member pivotally connected to said support arm and adapted to engage the lower surface of said plate member to hold said plate member in fractional contact with said support arm; and a U-shaped support bracket fixedly secured at its base to said vertical shaft, and U-shaped bracket having side elements pivotally connected to the outside of one end of said return auger conveyor whereby said conveyor may pivot from one side of said vertical shaft to the other side thereof.

3. In a feed mixing and blending machine, comprising, a feed wagon;

a first conveyor in said wagon;

a second conveyor in communication with said first conveyor for discharging said feed from said wagon;

a power shaft mounted on said wagon and adapted to be engaged by the power take-off of a prime mover;

an endless belt means adapted to encircle and operatively engage said power shaft;

means to operatively engage said belt means for driving said first and second conveyors;

a first member pivoted intermediate its ends to said feed wagon;

a belt tightening means on one end of said first member adapted to engage said endless belt means;

a second member connected at one end to the other end of said first member and extending generally perpendicular thereto; and a rocker arm having a transverse portion rigidly connected thereto, one end of said transverse portion pivotally connected to the other end of said second member, said rocker arm adapted to rotate to a first position with said transverse portion extending parallel to said second member and said second member pivoting said first member whereby said belt tightening means is moved into engagement with said endless belt means; and said rocker arm adapted to rotate to a second position with said transverse portion on the opposite side of the longitudinal axis of said rocker arm from its position in said first position and thereby releasing the pressure of said belt tightening means on said endless belt means.

4. In a feed mixing and blending machine, comprising, a feed wagon having a frame member;

a first conveyor in said wagon;

a second conveyor in communications with said first conveyor for discharging said feed from said wagon;

a power shaft mounted on said wagon and adapted to be engaged by the power take-off of a prime mover;

a drive shaft operatively connected to said second conveyor;

a platform for rotably supporting said drive shaft, said platform being pivotally secured at one end to said wagon frame member;

a rocker arm pivotally connected to the other end of said platform;

a member extending transversely of said rocker arm and secured thereto, said rocker arm adapted to pivot to a first position with said transverse member extending perpendicular to and in operative engagement with an adjacent portion of said wagon frame to move the longitudinal axis of said drive shaft away from the longitudinal axis of the power shaft and thereby tightening said endless belt means about said drive shaft and said power shaft; said rocker arm adapted to pivot to a second position with said transverse member extending at an angle to the adjacent portion of said wagon frame and with the axis of said drive shaft closer to the longitudinal axis of said power shaft and thereby releasing the tension in said endless belt means; and means for connecting said power shaft to said first conveyor for operating said first conveyor.

5. In a feed mixing and blending machine, comprising, a feed wagon;

a first conveyor in said wagon;

a second conveyor in communication with said first conveyor for discharging said feed from said wagon;

a power shaft mounted on said wagon and adapted to be engaged by the power take-off of a prime mover;

means connected to said first and second conveyors and connected to said power shaft to operate said conveyors;

a spout member adapted to engage the outer end of said second conveyor;

a hook means on the outer surface of said spout member extending outwardly thereof;

a hook means on the outer surface of said second conveyor adjacent its outer end and said spout member, said member on said second conveyor extending outwardly thereof;

a clamp means having a first member and a second member pivotally connected together, said second member having a spring loaded element normally biased towards said first member;

said first member adapted to be pivotally secured to one of said hook means; said spring loaded element adapted to bear against the side of the other hook means opposite from said one hook means; said second clamp member adapted to move to a locked position extending towards a longitudinal axis through said second conveyor, said second clamp member adapted to be moved to a released position wherein it extends outwardly of said longitudinal axis and on the opposite side of a plane extending through the point of contact between said spring loaded element and said other hook means and the pivotal axis of said first clamp member and said one hook means.

6. The structure of claim 5 wherein said first member of said clamp means is of a rod material with a portion extending through said one hook means, and the other hook means having a recess formed therein to receive the outer end of said spring loaded element.

7. In a feed mixing and blending machine, comprising, a feed wagon;

a feed discharge conveyor in communication with the inside of said wagon;

a support arm pivotally connected on a vertical axis to one end of said wagon at an outer corner of said wagon and adapted to pivot outwardly of said wagon in a horizontal plane between positions extending towards the opposite end of said wagon from said outer corner to positions extending forwardly of said one end of said wagon;

a return auger conveyor in communication with said feed discharge conveyor; and means for pivoting said auger to said support arm for pivotal movement in a horizontal plane, and said auger conveyor adapted to pivot on said means in a vertical plane for said auger conveyor to selectively transfer feed material into said feed wagon and outwardly of the end and side of said wagon adjacent said wagon corner.

8. A feed wagon;

a conveyor disposed on the floor of said wagon for moving feed to one end of said wagon, said floor conveyor disposed lengthwise of said wagon, a vertical disposed conveyor at said one end of said wagon in communication with said floor conveyor to move said feed upwardly from the floor of said wagon, a third conveyor horizontally disposed and extending transversely of said wagon along said one end and below the upper end of said vertical conveyor to receive feed from said vertical conveyor and more it to one side of said wagon, and a discharge opening in the outer end of said third conveyor at the side of said wagon, and a fourth conveyor in communication with the discharge opening of said third conveyor, a support arm pivotally connected on a vertical axis to one end of said wagon at an outer corner of said wagon and adapted to pivot outwardly of said wagon in a horizontal plane between positions extending towards the opposite end of said wagon from said outer corner to positions extending forwardly of said one end of said wagon, and said fourth conveyor pivotally secured to said arm for pivotal movement in horizontal and vertical planes.

References Cited by the Examiner

UNITED STATES PATENTS

| | | | |
|---|---|---|---|
| 2,347,552 | 4/1944 | Stinnett | 214—522 |
| 2,609,115 | 9/1952 | Oklejas | 214—521 |
| 2,767,963 | 10/1956 | Ringen et al. | |
| 2,862,275 | 12/1958 | Kessler | 24—270 |
| 2,877,914 | 3/1959 | Herr | 214—522 |
| 2,960,320 | 11/1960 | Heider. | |
| 2,998,152 | 8/1961 | Wognum et al. | 214—522 |
| 3,097,410 | 7/1963 | Lincoln | 24—270 |

References Cited by the Applicant

UNITED STATES PATENTS

| | | |
|---|---|---|
| 2,756,887 | 7/1956 | Raney et al. |
| 3,214,050 | 10/1965 | McConeghy. |

GERALD M. FORLENZA, *Primary Examiner.*

A. J. MAKAY, *Assistant Examiner.*